US011623288B2

(12) United States Patent
Freithofnigg (10) Patent No.: US 11,623,288 B2
(45) Date of Patent: Apr. 11, 2023

(54) SAW ASSEMBLY AND METHOD FOR OPERATING A SAW ASSEMBLY

(71) Applicant: PRINZ GMBH & CO KG, Loosdorf (AT)

(72) Inventor: Ingo Freithofnigg, Mauer/Melk (AT)

(*) Notice: Subject to any disclaimer, the term of this patent is extended or adjusted under 35 U.S.C. 154(b) by 0 days.

(21) Appl. No.: 16/629,956

(22) PCT Filed: Jul. 10, 2018

(86) PCT No.: PCT/EP2018/068603
§ 371 (c)(1),
(2) Date: Jan. 9, 2020

(87) PCT Pub. No.: WO2019/011889
PCT Pub. Date: Jan. 17, 2019

(65) Prior Publication Data
US 2020/0130079 A1    Apr. 30, 2020

(30) Foreign Application Priority Data

Jul. 11, 2017  (AT) .............................. A 50571/2017

(51) Int. Cl.
*B23D 57/02*  (2006.01)
*B27B 17/00*  (2006.01)
(Continued)

(52) U.S. Cl.
CPC ............ *B23D 57/02* (2013.01); *B27B 17/005* (2013.01); *B27B 17/0058* (2013.01); *B27B 17/02* (2013.01); *B27B 17/08* (2013.01)

(58) Field of Classification Search
CPC .... B27B 17/005; B27B 17/0058; B27B 17/08
(Continued)

(56) References Cited

U.S. PATENT DOCUMENTS 3,695,316 A * 10/1972 Pluckhahn ............ B27B 17/005
83/810
4,208,937 A *  6/1980 Marshall ............... B27B 17/005
83/574
(Continued)

FOREIGN PATENT DOCUMENTS

AT    509321 A4    8/2011
CH    645569 A5   10/1984
(Continued)

OTHER PUBLICATIONS

Search Report and Written Opinion dated Nov. 12, 2018 of International Application PCT/EP2018/068603.

*Primary Examiner* — Sean M Michalski
(74) *Attorney, Agent, or Firm* — Gordon & Jacobson, P.C.

(57) ABSTRACT

A method for operating a saw assembly as well as a saw assembly, having a chainsaw (1) with a circulating saw chain (2) and a chain drive sprocket (3) for driving the saw chain (2). The chainsaw (1) is secured to a moving device (8) via a chainsaw swivel device (19). The moving device (8) has a first operating mode, in which the chainsaw (1) is moved or movable from a first position through a saw area (9) and through the cutting material (18) into a second position, and the moving device (8) has a second operating mode, in which the chainsaw (1) is moved or movable from the second position back through the saw area (9) and through the cutting material (18) into the first position.

19 Claims, 4 Drawing Sheets

(51) Int. Cl.
*B27B 17/02* (2006.01)
*B27B 17/08* (2006.01)

(58) Field of Classification Search
USPC .......................................... 83/798, 811, 812
See application file for complete search history.

(56) References Cited

U.S. PATENT DOCUMENTS

| | | |
|---|---|---|
| 5,784,941 A | 7/1998 | Sanborn |
| 2006/0060049 A1* | 3/2006 | Learnard ................ B27B 27/02 83/485 |
| 2012/0037276 A1 | 2/2012 | Granberg et al. |

FOREIGN PATENT DOCUMENTS

| | | | | |
|---|---|---|---|---|
| DE | 196 11 593 | * | 9/1997 | ......... B27B 17/0083 |
| EP | 1972418 A1 | | 9/2008 | |

* cited by examiner

SAW ASSEMBLY AND METHOD FOR OPERATING A SAW ASSEMBLY

CROSS-REFERENCE TO RELATED APPLICATION(S)

This application is the National Stage of International Patent Application No. PCT/EP2018/068603 filed on Jul. 10, 2018, which claims priority from Austrian Patent Application No. A50571/2017 filed on Jul. 11, 2017, both of which are herein incorporated by reference herein in their entireties.

BACKGROUND

The invention relates to a saw assembly and a method for operating a saw assembly.

In particular, the invention relates to a saw assembly with a chainsaw, which is used for crosscutting, in particular for trimming, large-volume long or continuous products, such as board stacks or plastic pipes.

Known in prior art are sawing devices in which the material to be cut is fed to a chainsaw. In a next step, the chainsaw is moved with a moving device proceeding from a basic position through the saw area, thereby crosscutting or trimming the cutting material. Once the desired cut has been performed, the saw is conveyed back into its basic position again. The cutting material is then conveyed further to perform a further cut. In conventional devices, the cut made with the chainsaw always takes place in only one direction. When returning the chainsaw to its initial position, this results in an idle stroke, which reduces the efficiency of the method and device. This happens because chainsaws for machining large-volume objects can only cut efficiently on the side where the chain is pulled toward the drive wheel.

In addition, the cutting direction can also not be varied in conventional devices, since the chainsaw is guided along a straight line, and thus can only cut in one direction.

SUMMARY

The object of the invention is now to overcome the disadvantages of prior art, and create a saw assembly and method that enables an efficient machining of large-volume cutting material.

The object according to the invention is achieved with a saw assembly, comprising a chainsaw with a circulating saw chain and a chain drive sprocket for driving the saw chain, wherein the saw chain proceeds from a chain drive sprocket along an elongated contour, running first through a section exiting the chain drive sprocket, followed by a deflecting section, and then a section entering in the direction of the chain drive sprocket, wherein the exiting section of the saw chain is arranged on one side of the chainsaw, wherein the entering section of the saw chain is arranged on the opposite side of the chainsaw, and wherein a chainsaw swivel device is provided, which is set up to swivel the entering section of the saw chain into a selectable cutting direction.

It is preferably provided that the chainsaw be secured to a moving device via the chainsaw swivel device.

It is preferably provided that the moving device be set up to move the chainsaw through a saw area along varying, selectable cutting directions.

Optionally, it is provided that a feed device with a feed drive and feed guide be provided for moving the cutting material to be cut, the feed direction of which runs in particular transverse to the cutting direction or essentially normal to the saw area.

Optionally, it is provided that the chainsaw swivel device comprise a first swivel part and a second swivel part, that the first swivel part be secured to the moving device, and can thus be moved with the moving device, that the chainsaw be secured to the second swivel part, and that the second swivel part have a degree of freedom, if necessary fixable, to swivel around a rotational axis relative to the first swivel part.

Optionally, it is provided that a swivel drive be provided for controllably swiveling the second swivel part relative to the first swivel part, and thus for controllably swiveling the chainsaw.

Optionally, it is provided that a chain drive be provided for driving the chain drive sprocket, and thus for driving the saw chain, and that the chain drive be connected, in particular rotatably connected, with the second swivel part and/or secured to the second swivel part.

Optionally, it is provided that the moving device comprise a motion drive and a motion guide for moving the chainsaw along the cutting directions.

It is preferably provided that the moving device have a first operating mode, in which the chainsaw is moved or movable from a first position through the saw area and through the cutting material into a second position, and that the moving device have a second operating mode, in which the chainsaw is moved or movable from the second position back through the saw area and through the cutting material into the first position.

Optionally, it is provided that the moving device and feed device have an operating mode in which the cutting material is crosscut or cut at an inclination by simultaneously, synchronously operating the moving device and feed device, and by tilting the chainsaw in the inclined cutting direction.

Optionally, it is provided that a control device be provided for controlling, and in particular for jointly and/or synchronously operating, the moving device and feed device, and for controlling the chainsaw swivel device.

Optionally, it is provided that the section of the saw chain entering in the chain drive sprocket direction faces in the cutting direction in all cutting directions and/or in all operating modes, and thus is arranged at the front along the cutting direction.

Optionally, it is provided that the moving device be designed as a parallel moving device for the parallel guidance of the chainsaw transverse and in particular normal to the feed direction.

Optionally, the invention relates to a method for operating the saw assembly, wherein the saw assembly comprises a chainsaw with a circulating saw chain and a chain drive sprocket for driving the saw chain, wherein the saw chain proceeds from a chain drive sprocket along an elongated contour, running first through a section exiting the chain drive sprocket, followed by a deflecting section, and then a section entering in the direction of the chain drive sprocket, wherein the exiting section of the saw chain is arranged on one side of the chainsaw, and wherein the entering section of the saw chain is arranged on the opposite side of the chainsaw, and wherein a chainsaw swivel device is provided, which is set up to swivel the entering section of the saw chain into a selectable cutting direction, wherein a first cutting direction is selected, wherein the chainsaw is aligned in the first cutting direction by actuating the chainsaw swivel device, and wherein the cutting material is cut along the first cutting direction.

Optionally, it is provided that the cutting material be further conveyed along a feed direction, that a second cutting direction be selected, that the chainsaw be aligned in the second cutting direction by actuating the chainsaw swivel device by turning it around a rotational axis, and that the cutting material be cut along the second cutting direction.

Optionally, it is provided that the first and/or second cutting direction run at an inclination to the feed direction.

Optionally, it is provided that, in order to cut the cutting material along an inclined cutting direction, the chainsaw be tilted, and thereby aligned in the cutting direction, that the chainsaw be moved transverse to the feed direction, and in particular parallel, during the cutting process, and that the cutting material be moved along the feed direction during the cutting process.

Optionally, it is provided that the chainsaw be moved by actuating a moving device for cutting along the first and/or second cutting direction.

Optionally, it is provided that the cutting material be moved along the feed direction by actuating a feed device.

Optionally, it is provided that the cutting material be alternatingly crosscut or cut along the first and second cutting direction by actuating the moving device and feed device.

Optionally, it is provided that the section of the saw chain entering in the direction of the chain drive sprocket face in the respective cutting direction while cutting along the first cutting direction and while cutting along the second cutting direction.

Optionally, it is provided
that the exiting section of the saw chain be arranged on one side of the chainsaw,
that the entering section of the saw chain be arranged on the opposite side of the chainsaw, and
that the chainsaw be swiveled by actuating a chainsaw swivel device after cutting the cutting material along the first cutting direction and before cutting the cutting material along the second cutting direction, and during further cuts also after again cutting the cutting material along the second cutting direction and before again cutting the cutting material along the first cutting direction,
so that the entering section of the saw chain is aligned in the cutting direction both while cutting the cutting material along the first cutting direction and cutting the cutting material along the second cutting direction.

In particular, the invention relates to a saw assembly comprising a chainsaw with at least one circulating saw chain and at least one chain drive sprocket for driving the saw chain, wherein the saw chain or saw chains each proceed from the chain drive sprocket along an elongated contour, running first through a section exiting the chain drive sprocket, followed by a deflecting section, and then a section entering in the direction of the chain drive sprocket.

It is preferably provided that a moving device be provided, which is set up to move the chainsaw through a saw area along two opposite cutting directions.

Optionally, it is provided that the moving device comprise a motion drive and a motion guide for moving the chainsaw along two opposite cutting directions.

Optionally, it is provided that the moving device have a first operating mode, in which the chainsaw is moved or movable from a first position through the saw area and through the cutting material into a second position.

Optionally, it is provided that the moving device have a second operating mode, in which the chainsaw is moved or movable from the second position back through the saw area and through the cutting material into the first position.

Optionally, it is provided that the section of the saw chain entering in the direction of the chain drive sprocket or one each of the section of the saw chains entering in the direction of the chain drive face in the cutting direction in both cutting directions and/or in both operating modes, and thus be arranged at the front along the respective cutting direction.

Optionally, it is provided that the moving device be set up to perform a swiveling motion, a straight line motion or a combination of a swiveling motion and straight line motion of the chainsaw.

Optionally, it is provided that the moving device be designed as a swivel moving device, as a parallel moving device or as a combined swivel-parallel moving device.

Optionally, it is provided that the saw area run along a plane defined by the movement of the chainsaw through the moving device.

Optionally, it is provided that a feed device with a feed drive and feed guide be provided for moving the cutting material to be cut, the feed direction of which runs transverse to the cutting direction, and in particular essentially normal to the saw area.

Optionally, it is provided that the exiting section of the saw chain be arranged on one side of the chainsaw, that the entering section of the saw chain be arranged on the opposite side of the chainsaw, and that a chainsaw swivel device be provided that is set up to align the entering section of the saw chain in the cutting direction.

Optionally, it is provided that an entering section of the saw chain be arranged on one side of the chainsaw, that an additional entering section of a second saw chain be arranged on the opposite side of the chainsaw, and that the one entering section face in the cutting direction as the chainsaw moves along the first cutting direction and/or in the first operating mode, and the additional entering section face in the cutting direction as the chainsaw moves along the second cutting direction and/or in the second operating mode.

Optionally, the invention relates to a method for operating a saw assembly, wherein the saw assembly comprises a chainsaw with at least one circulating saw chain and at least one chain drive sprocket for driving the saw chain, wherein the saw chain or saw chains each proceed from the chain drive sprocket along an elongated contour, running first through a section exiting the chain drive sprocket, followed by a deflecting section, and then a section entering in the direction of the chain drive sprocket, and wherein a moving device is provided that is set up to move the chainsaw through a saw area along two opposite cutting directions, comprising the following steps:
Cutting the cutting material along a first cutting direction by actuating the moving device and moving the chainsaw along the first cutting direction through the saw area,
then further conveying the cutting material transverse to the cutting direction and transverse to the saw area by actuating a feed device,
then cutting the cutting material along a second cutting direction by actuating the moving device and moving the chainsaw along the second cutting direction through the saw area,
wherein the second cutting direction is preferably opposite the first cutting direction,
then, optionally, once again further conveying the cutting material transverse to the cutting direction and transverse to the saw area, and once again cutting the cutting material along the first cutting direction by actuating the moving device and moving the chainsaw along the first cutting direction through the saw area.

Optionally, it is provided that the cutting material be alternatingly crosscut or cut along the first and second cutting direction by actuating the moving device and feed device.

Optionally, it is provided that the section of the saw chain entering in the direction of the chain drive sprocket or one of the sections of the saw chain entering in the direction of the chain drive sprocket face in the respective cutting direction while cutting along the first cutting direction and while cutting along the second cutting direction.

Optionally, it is provided that, to perform the cutting motion, the moving device makes the chainsaw swivel or move along a straight line, or performs a combination of a swivel motion and a straight motion.

Optionally, it is provided that the saw area run along a plane defined by the movement of the chainsaw through the moving device.

Optionally, it is provided that the exiting section of the saw chain be arranged on one side of the chainsaw,
that the entering section of the saw chain be arranged on the opposite side of the chainsaw,
and that the chainsaw be swiveled, in particular by 180°, by actuating a chainsaw swivel device after cutting the cutting material along the first cutting direction and before cutting the cutting material along the second cutting direction, and during further cuts also after again cutting the cutting material along the second cutting direction and before again cutting the cutting material along the first cutting direction, so that the entering section of the saw chain is aligned in the cutting direction both while cutting the cutting material along the first cutting direction and cutting the cutting material along the second cutting direction.

It is preferably provided that, before and after the saw area, a respective free space be provided along the cutting directions for receiving the chainsaw as the cutting material is further conveyed in the feed direction and/or for rotating the chainsaw for alignment in one of the cutting directions.

In all embodiments, it can be provided that the saw assembly comprise a machine frame on which the components of the saw assembly are secured, thereby yielding a floor-mounted saw assembly.

In all embodiments, it is preferably provided that the contour of the saw chain or contours of the saw chains and the cutting directions lie in a shared plane.

Optionally, all embodiments provide a control device for controlling the drives, in particular the moving device, the feed device and the chainsaw swivel device. This control device can be a conventional control device, which is set up to control the drives of the different components. In particular, this is advantageous or necessary when a drive is to be controlled as a function of another drive, for example when performing an inclined cutting motion. During an inclined cutting motion, the control device is suitable or set up in particular to perform a proportional movement of the moving device relative to the feed device. In particular, the swivel position of the chainsaw is selected in relation to this proportionality.

According to a preferred embodiment, the saw assembly is designed as a miter saw. Such a miter saw comprises a chainsaw, the saw area of which is roughly 1×1 m or larger, in particular up to 2.6 m×2.6 m or larger. The length of the chainsaw or guiderail or saw chain provided for cutting purposes is larger than 1 m in this embodiment.

In miter saws, the cutting material can essentially be fed to the chainsaw along a horizontal surface. The saw area preferably runs in a normal plane of the feed direction, and is defined in particular by the movement of the chainsaw along the cutting directions. For making the cut, the chainsaw can be moved along the cutting directions vertically, i.e., from the top down or from the bottom up. This movement is produced by the moving device.

Alternatively thereto, the chainsaw can also be stationary in design, as a result of which the elongated contour essentially runs along a vertical direction. In this embodiment, the moving device can be set up to move the chainsaw horizontally and transversely to the feed direction.

For example, the swivel drive of the chainsaw swivel device can be designed as a torque drive, torque motor and/or as a continuously adjustable actuator, if necessary with self-locking effect or a brake. Optionally, the swivel drive of the chainsaw swivel device can comprise hydraulic or pneumatic cylinders, with which the chainsaw can be swiveled into several fixed positions, for example.

The invention will now be described further below based upon different, nonrestrictive exemplary embodiments.

DETAILED DESCRIPTION

Unless otherwise indicated, the reference numbers listed on the figures correspond to the following components:

Chainsaw 1, saw chain 2, chain drive sprocket 3, contour 4, exiting section 5, deflecting section 6, entering section 7, moving device 8, saw area 9, first cutting direction 10, second cutting direction 11, motion drive 12, motion guide 13, feed device 14, feed drive 15, feed guide 16, feed direction 17, cutting material 18, chainsaw swivel device 19, first swivel part 20, second swivel part 21, swivel drive 22, chain drive 23, guiderail 24, free space 25, holding down device 26, rotational axis 27.

Figure 1:
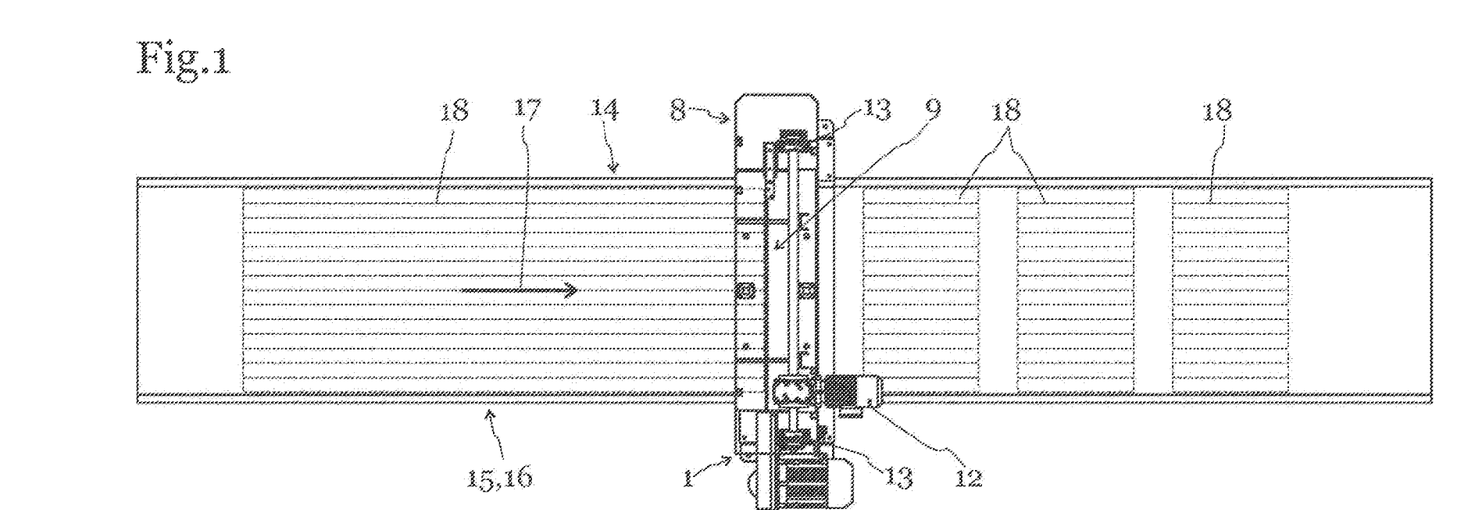
FIG. 1 shows a schematic top view of a possible configuration of a saw assembly according to the invention.

FIG. 1 shows a top view of a possible configuration of a saw assembly with a chainsaw 1, which is arranged so that it can be moved by a moving device 8. The moving device 8 comprises a motion drive 12 along with a motion guide 13. In the present embodiment, the motion drive 12 is an electric rotary drive, which is connected with two chains by a transversely running shaft. These chains can in this way be moved by driving the motion drive 12. The chainsaw 1 is also connected with the chains, so that it can be shifted by moving the chains. A motion guide 13 is provided for guiding the chainsaw 1 while it is moving, which in this view essentially runs projectingly, for example comprising a straight rail guide. However, the inventive idea can also involve configuring the motion drive 12 or motion guide 13 with other suitable means, for example as a spindle drive, linear drive, toothed rack or chain hoist.

The saw assembly on FIG. 1 further comprises a feed device 14 for moving the cutting material 18 along a feed direction 17. To this end, the feed device has a feed drive 15 and a feed guide 16, wherein the feed drive 15 consists of a driven roller, for example, and the feed guide 16 consists of a support sheet, a roller assembly, or a traversable wagon or carriage, for example. In the present embodiment, the cutting material 18 is fed to the chainsaw 1, and crosscut in determinable or predetermined intervals.

In the present embodiment, the chainsaw 1 essentially moves along a projectingly running direction. The saw area 9 is arranged in the area where the cutting material 18 is cut by the chainsaw 1. In particular, the saw area 9 is defined by the movement of the chainsaw 1.

Figure 2:
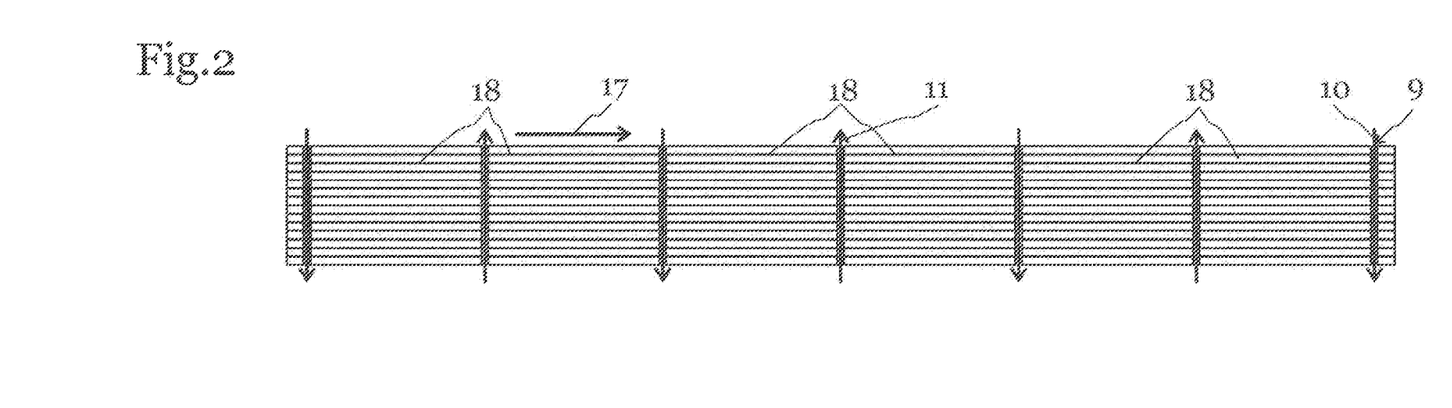
FIG. 2 shows a possible cutting progression of a saw assembly according to the invention.

FIG. 2 shows a schematic illustration of a possible cutting guide of a saw assembly according to the invention. The cutting material 18 is moved along a feed direction 17 and, as on FIG. 2, stopped at regular intervals. In a first step, the cutting material 18 is crosscut along a first cutting direction 10. In particular, the first cut on the right side of the present illustration makes it possible to trim the ends of the cutting material 18. When subsequently cutting along the first cutting direction 10, the chainsaw 1 is moved through the entire saw area 9, thereby trimming or crosscutting the cutting material 18. In an additional cut, the cutting material 18 is moved further along the feed direction 17. The chainsaw 1, which in the first cut was moved from a first position into a second position, remains in the second position during this feed motion in the feed direction 17. Once the cutting material 18 is situated in the position where the second cut is to take place, the chainsaw 1 is in turn moved along the second cutting direction 11 through the saw area 9, as a result of which the cutting material 18 is again crosscut. An idle stroke in which the chainsaw 1 is returned to its first position again without the cutting material 18 being machined can be eliminated during this operation. The cutting material 18 can then be moved further, so as to again perform a cut along the first cutting direction 10.

As a consequence, this arrangement and this method make it possible to alternatingly crosscut or cut the cutting material 18 along the first cutting direction 10 and second cutting direction 11, as denoted by the arrows on FIG. 2.

Optionally, it is provided in all embodiments that a free space 25 (FIG. 6) be formed below the transport surface for the cutting material 18, in particular recessed in the transport surface of the cutting material 18, in which the chainsaw 1 can be arranged, so that when the chainsaw is in its second position, the cutting material can be transported further without the cutting material having to queue at the chainsaw 1. It is also preferably provided that a free space 25 be available for the chainsaw 1 on the other side of the saw area 9, in which the chainsaw 1 can be arranged, so that the cutting material can be further conveyed when the chainsaw 1 is in its first position.

Figure 3A:
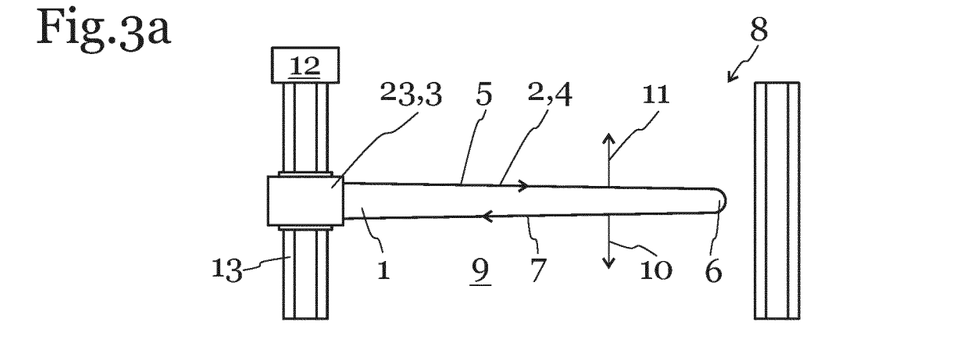
FIGS. 3a to 3e show various embodiments of moving devices for moving the chainsaws in schematic illustrations.

FIGS. 3a to 3e show different possible concepts of moving devices 8. FIG. 3a shows a moving device 8 with a motion guide 13 and a motion drive 12 for moving the chainsaw 1. The chainsaw 1 or its saw chain 2 projects from a motion guide 13. In this embodiment, the chainsaw 1 is only guided and driven on one side. As in all embodiments 3a to 3e, the chainsaw 1 comprises a saw chain 2, which runs along a contour 4 proceeding from a chain drive sprocket 3 (not shown) driven by a chain drive 23, an exiting section 5 of a deflecting section 6 and an entering section 7. In the present embodiment of FIG. 3a, the chainsaw 1 can be moved by a parallel guide essentially parallel through the saw area 9. In particular, this chainsaw 1 can be moved along a first cutting direction 10 and along a second cutting direction 11. As a result, the moving device 8 is designed as a parallel moving device.

Figure 3B:
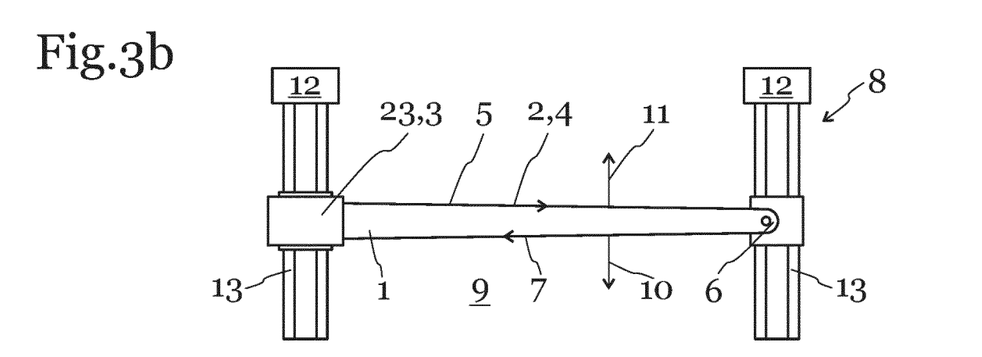

The embodiment on FIG. 3b essentially corresponds to embodiment 3a, except that the chainsaw 1 is also guided on a motion guide 13 in the area of the deflecting section 6. In the present embodiment, the motion guide 13 thus comprises two guides, which in particular are arranged at both ends of the chainsaw 1, so that the chainsaw 1 is guided on both sides. For example, this parallel guide can be driven via the motion drive 12, wherein the driving motion can be transmitted from the motion drive 12 to the chainsaw 1 on one side, i.e., only on one guide, on both sides, i.e., on both guides or at another location. The embodiment on FIG. 3b also has a parallel guide for the chainsaw 1, as a result of which the moving device 8 is designed as a parallel moving device.

Figure 3C:
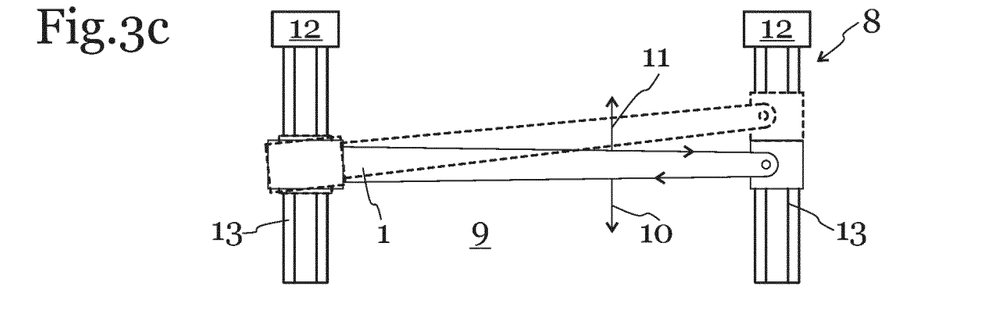

FIG. 3c shows another embodiment of a possible moving device 8, in which the chainsaw 1 is guided on both sides by the motion guide 13. The motion drive 12 offers the capability of moving the chainsaw 1 in the area of the one guide differently than in the area of the other guide, which makes it possible to tilt and swivel the chainsaw 1. This embodiment, in particular controllably and alternatingly driving the individual components, makes it possible to swivel the chainsaw 1 or perform a rocking cut. As a result, the moving device 8 is designed as a combined swivel-parallel moving device.

Figure 3D:
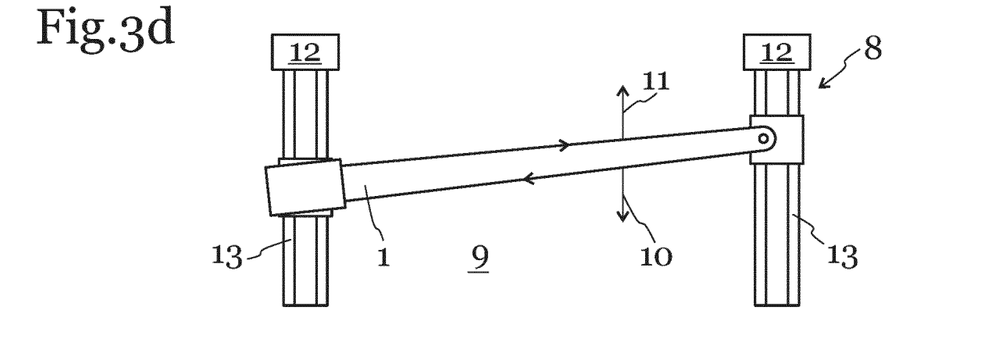

By contrast, the chainsaw 1 in the moving device 8 on FIG. 3d is set in a fixed tilted position, wherein the tilted chainsaw 1 can be moved through the saw area guided parallel along the motion guide 13.

Figure 3E:
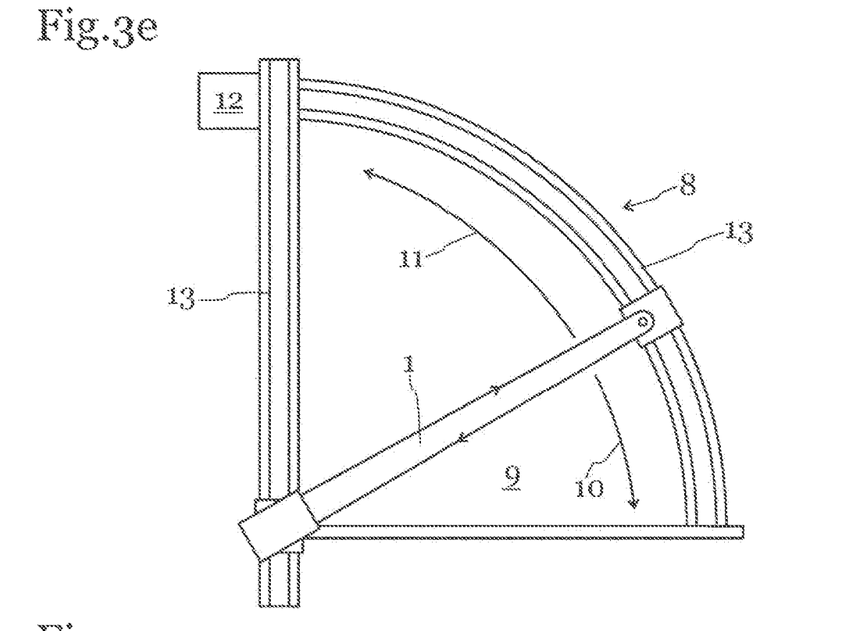

FIG. 3e shows another embodiment of a possible moving device 8. In this embodiment, the chainsaw 1 is swivelably arranged. The first cutting direction 10 and second cutting direction 11 are circular in design. The motion drive 12 is set up to move the chainsaw 1 along an arched motion guide 13. In the present embodiment, the motion guide 13 further comprises a rotational or swiveling axis, on which the chainsaw 1 is rotatably mounted. As a result, the moving device 8 is designed as a swivel moving device.

Figure 4:
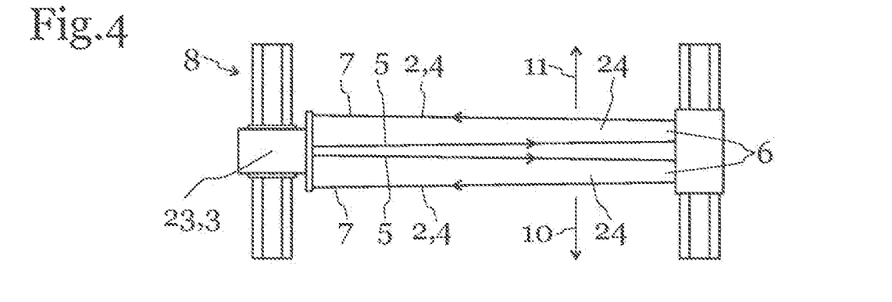
FIG. 4 shows a possible configuration of a chainsaw in a schematic illustration.

FIG. 4 shows a schematic view of another detail of a possible embodiment of a saw assembly according to the invention. In this embodiment, the chainsaw 1 comprises two saw chains 2. These two saw chains 2 each extend along an elongated contour 4, proceeding from a chain drive sprocket 3, which in the present embodiment is hidden behind a housing, along an exiting section 5 to a respective deflecting section 6 and a respective entering section 7. The two entering sections 7 are arranged on the outside along the cutting directions. As a result, this chainsaw 1 can be moved in both cutting directions 10, 11, wherein an entering section 7 is frontally aligned, i.e., in the direction of the cutting material, in both cutting directions 10, 11.

In particular, this chainsaw 10 comprises two guiderails 24 for guiding the saw chains 2. In particular, the two guiderails 24 are arranged parallel and/or flush relative to each other, so that the two saw chains 2 are arranged flush during a cutting motion along the first cutting direction 10 and/or along the second cutting direction 11, and thus can be guided in the same saw gap. The first cutting direction 10 and second cutting direction 11 run in the image plane in this view. In all other embodiments with two guiderails 24 and/or with two saw chains 2, it is preferably provided that the contours 4 and cutting directions 11, 12 lie in a shared plane.

For example, the two saw chains 2 can be driven via a single chain drive 23, the rotational movement of which is conveyed to two chain drive sprockets 3 via a gear unit. As an alternative, two chain drives 23 can also be provided, wherein each chain drive 23 acts on a respective chain drive sprocket 3 for moving a respective saw chain 2.

Such an embodiment with two guiderails 24 and/or with two saw chains 2 can be provided on any of the moving devices according to FIGS. 3a to 3e.

Figure 5:
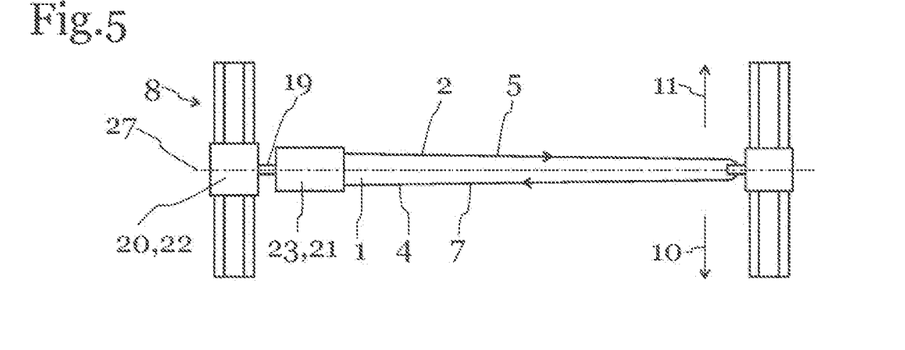
FIG. 5 shows another embodiment of a possible arrangement of a chainsaw in a schematic illustration.

FIG. 5 shows details of another embodiment of a saw assembly in a schematic view. In this embodiment, a chainsaw 1 is again provided on a moving device 8. In particular, the chainsaw 1 is connected with the moving device 8 via a chainsaw swivel device 19. The chainsaw swivel device 19 is suitable and/or set up for swiveling and/or turning the chainsaw 1. In particular, the chainsaw swivel device 19 comprises a first swivel part 20 and a second swivel part 21, wherein the second swivel part 21 is arranged so that it can swivel or rotate relative to the first swivel part 20. In the position shown on FIG. 5, the entering section 7 is arranged at the top, so that the cutting material 18 can be cut along the second cutting direction. In order to now enable a cutting along the first cutting direction 10, the chainsaw swivel device 19 can be actuated, which causes the chainsaw 1 to swivel in such a way that the entering section 7 faces in the first cutting direction 10. In the present embodiment, the two cutting directions 10 and 11 lie in a plane aligned diametrically opposite each other, so that the chainsaw 1 has to be swiveled by 180° to be rotated from the first cutting direction 10 into the second cutting direction 11 or from the second cutting direction 11 into the first cutting direction 10. For example, the rotation here takes place along a centrally running rotational axis 27, which runs in the plane of the contour 4 and the guiderail 24. Optionally, however, the rotational axis is eccentrically arranged, so that the guiderail 24 or saw chain 2 is provided with a certain lag relative to the respective cutting direction. A swivel drive 22 is preferably provided to actuate the chainsaw swivel device 19, and can be used to swivel the second swivel part 21 relative to the first swivel part 20. For example, this swivel drive is a rotary drive, e.g., an electric rotary drive.

In particular, for example, the swivel drive 22 of the chainsaw swivel device 19 can be designed as a torque drive, torque motor and/or continuously adjustable actuator, if necessary with a self-locking effect or brake. Optionally, the swivel drive 22 of the chainsaw swivel device 19 can comprise hydraulic or pneumatic cylinders, with which the chainsaw 1 can be swiveled into several fixed positions, for example.

In all embodiments, including in the embodiment on FIG. 5, the chain drive 23 is preferably connected, in particular rigidly or non-rotatably connected, with the second swivel part 21, so that actuating the chainsaw swivel device 19 also causes the chain drive 23 to swivel along. This makes it possible to avoid a comparatively complicated drive for transmitting the movement of the chain drive 23 to the swivelably arranged saw chain 2. In particular, the chainsaw 1 can be designed as a conventional chainsaw, which by means of the moving device and chainsaw swivel device 19 can be moved along the first cutting direction 10 and along the second cutting direction 11 on the one hand, and swiveled around the rotational axis 27 on the other.

According to an alternative embodiment, however, the chain drive 23 can also be provided on the first swivel part 20. For example, the rotation can here be transmitted from the chain drive 23 to the chain drive sprocket 3 or to the saw chain 2 via a bevel gear, wherein a shaft of the bevel gear is arranged coaxially with the rotational axis 27 of the chainsaw swivel device 19. A bevel gear pair provided in the area of the second swivel part 21 can subsequently be used to transmit the rotational motion to the chain drive sprocket 3, which is provided on the second swivel part 21 in this alternative embodiment.

Such an embodiment with a chainsaw swivel device 19 can be provided on any moving device according to FIGS. 3a to 3e.

Figure 6:
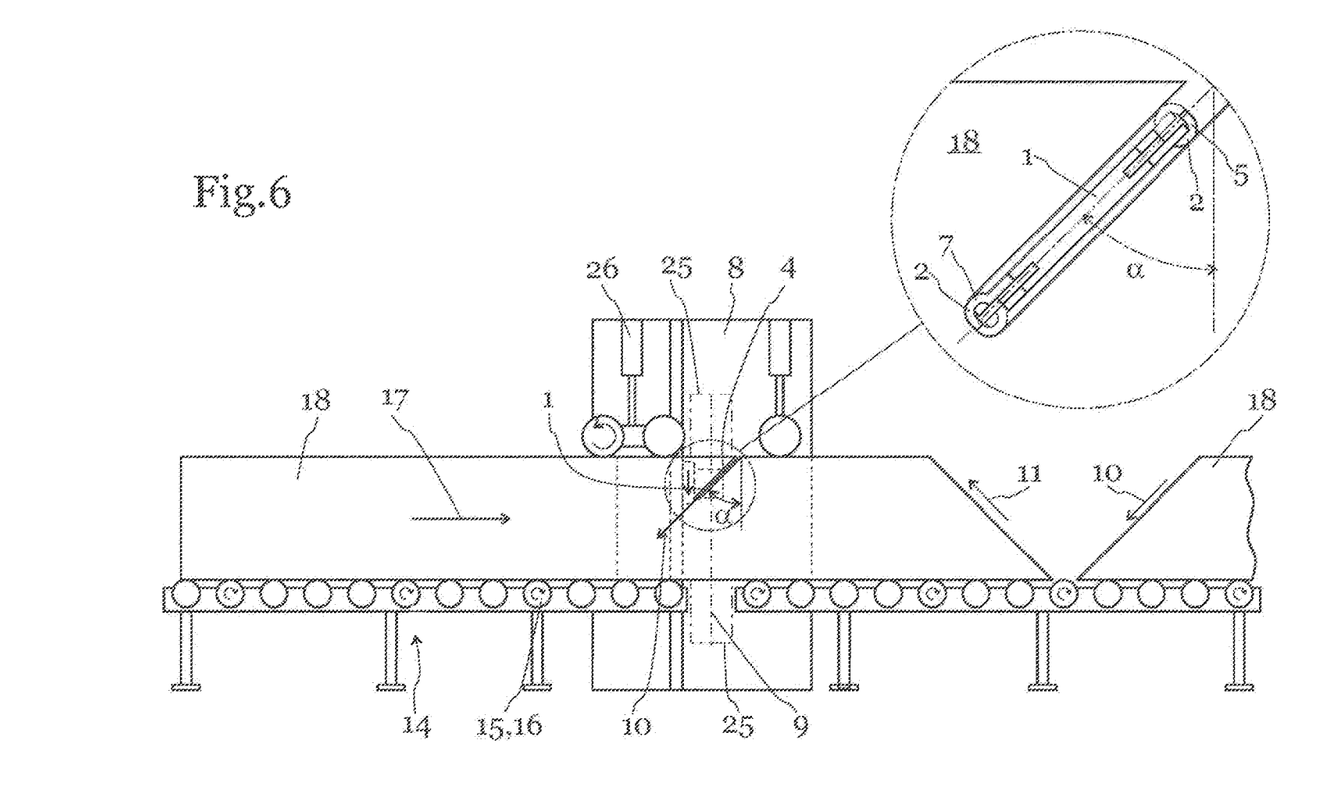
FIG. 6 shows another schematic view of a saw assembly, in which inclined cutting directions are also possible.

FIG. 6 shows another embodiment of a saw assembly according to the invention in a schematic side view, as well as a detail showing a chainsaw 1 that has cut into the cutting gap.

The assembly comprises a chainsaw 1, with a saw chain 2 that proceeds from a chain drive sprocket 3 (not visible) along a section 5 exiting from the chain drive sprocket 3, running into a deflecting section 6 (not shown) and further into a section 7 entering in the direction of the chain drive sprocket.

The entering section 7 of the saw chain 2 is preferably aligned in the cutting direction. A moving device 8 is provided for moving the chainsaw 1 and in particular for moving the chainsaw 1 along a first or a second cutting direction. In the present embodiment, preferably in all embodiments, this moving device 8 acts transversey to the feed direction 17 of the cutting material 18. In the present embodiment, the cutting directions 10, 11 are tilted, and deviate by a specific angle $\alpha$ from the vertical or from the horizontal. In the present embodiment, the inclined cutting guide is established by tilting the chainsaw 1 by an angle $\alpha$, wherein the moving device 8 and feed device 14 are simultaneously actuated. The feed device 14 comprises at least one feed drive 15 and one feed guide 16. In the present embodiment, the feed drive 15 and feed guide 16 are formed by rollers, which are at least partially driven. As a result, the cutting material 18 can be moved along the feed direction 17 and fed to the chainsaw 1. A synchronized movement or a synchronized operation of the moving device 8 and feed device 14 makes it possible to select the speed at which the chainsaw 1 moves relative to the cutting material 18 in such a way that the cutting movement coincides with the cutting direction 10, and a straight cut takes place along the first cutting direction 10. During this cutting movement, the chainsaw 1 can be guided parallel, and in particular guided vertically parallel.

In particular, a respective free space 25 is provided in the saw area 9 or along the two cutting directions 10 and 11 outside of the saw area 9, in which the chainsaw 1 can be arranged when a cut has been completed. In particular, this free space 25 must be dimensioned in such a way that the entire chainsaw 1 or the entire saw chain 2 can be guided out of the cutting material 18, so that the cutting material 18 can be conveyed further without hitting an element of the chainsaw 1. In this free space 25, the chainsaw 1 can also be swiveled in such a way that another cut can be made in a second cutting direction 11 or in any other cutting direction desired. The angle of the cutting direction can here be determined by actuating the feed device 14, the moving device 8 and the chainsaw swivel device 19. The cutting direction 10 can run in a normal plane of the feed direction 17, inclined to the feed direction 17 or even opposite the feed direction 17.

If the cut runs opposite the feed direction 17, the moving device 8 remains essentially immobile during the cut. In the present configuration, such a cut would result in a horizontal cut through the cutting material 18.

In all embodiments, a holding down device 26 can be provided, which exposes at least one side of the cutting material 18 to a retaining force, in particular to press it against the feed guide 16 and/or the feed drive 15. Elements of the holding down device can be provided along the feed direction 17 before and after the chainsaw 1.

The invention claimed is:

1. A saw assembly, comprising a chainsaw that includes a chain drive sprocket driving a circulating saw chain, wherein the saw chain proceeds from the chain drive sprocket along an elongated contour, running first through an exiting section exiting the chain drive sprocket, followed by a deflecting section, and then an entering section entering in the direction of the chain drive sprocket, wherein the exiting section of the saw chain is arranged on one side of the chainsaw, and wherein the entering section of the saw chain is arranged on the opposite side of the chainsaw, wherein a chainsaw swivel device is configured to swivel the entering section of the saw chain into a particular cutting direction selected from varying, selectable cutting directions, wherein the chainsaw is secured to a moving device via the chainsaw swivel device, and wherein the moving device is configured to guide movement of move the chainsaw vertically through a saw area with the entering section of the saw chain extending along the particular cutting direction set by the chainsaw swivel device, wherein the saw area is configured to be occupied by material cut by the chainsaw during use of the saw assembly, and wherein the chainsaw swivel device is further configured to swivel the entering section of the saw chain to an inclined cutting direction offset from vertical for inclined cutting through the saw area;

wherein the moving device has a first operating mode, in which the chainsaw is displaced vertically from a first position in which the saw chain is disposed above the saw area and through the saw area and into a second position in which the saw chain in its entirety is disposed below the saw area such that the chainsaw can swivel to cut in a different cutting direction, wherein the moving device has a second operating mode, in which the chainsaw is displaced vertically from the second position back through the saw area into the first position.

2. The saw assembly according to claim 1, further comprising a feed device with a feed drive and a feed guide configured to move the material in a feed direction that runs in particular transverse to the cutting direction or essentially normal to the saw area.

3. The saw assembly according to claim 1, wherein the chainsaw swivel device comprises a first swivel part and a second swivel part, wherein the first swivel part is secured to the moving device and can thus be moved with the moving device, wherein the chainsaw is secured to the second swivel part, and wherein the second swivel part has a degree of freedom to swivel around a rotational axis relative to the first swivel part.

4. The saw assembly according to claim 3, further comprising a swivel drive configured to controllably swivel the second swivel part relative to the first swivel part in order to controllably swivel the chainsaw.

5. The saw assembly according to claim 3, further comprising a chain drive configured to drive the chain drive sprocket and thus drive the saw chain, wherein the chain drive is rotatably connected to the second swivel part or secured to the second swivel part.

6. The saw assembly according to claim 1, wherein the moving device comprises a motion drive and a motion guide configured to move the chainsaw along the particular cutting direction set by the swivel device.

7. The saw assembly according to claim 2, wherein the moving device and feed device have an operating mode in which material that occupies the saw area is crosscut or cut at an inclination by simultaneously, synchronously operating the moving device and feed device, and by tilting the chainsaw in the inclined cutting direction.

8. The saw assembly according to claim 2, further comprising a control device configured to jointly or synchronously operate the moving device and feed device and to control the chainsaw swivel device.

9. The saw assembly according to claim 1, wherein the entering section of the saw chain faces in the cutting direction in all cutting directions or in all operating modes, and thus is arranged at the front along the cutting direction.

10. The saw assembly according to claim 2, wherein the moving device is designed as a parallel moving device for the parallel guidance of the chainsaw normal to the feed direction.

11. A method for operating a saw assembly to cut material, wherein the saw assembly comprises a chainsaw that includes a chain drive sprocket driving with a circulating saw chain, wherein the saw chain proceeds from the chain drive sprocket along an elongated contour, running first through an exiting section exiting the chain drive sprocket, followed by a deflecting section, and then an entering section entering in the direction of the chain drive sprocket, wherein the exiting section of the saw chain is arranged on one side of the chainsaw, and wherein the entering section of the saw chain is arranged on the opposite side of the chainsaw, wherein a chainsaw swivel device is configured to swivel the entering section of the saw chain into a first cutting direction selected from varying, selectable cutting directions, wherein the chainsaw is secured to a moving device via the chainsaw swivel device, and wherein the moving device is configured to guide movement of the chainsaw vertically through a saw area with the entering section of the saw chain extending along the first cutting direction set by the chainsaw swivel device, wherein the saw area is configured to be occupied by material cut by the chainsaw during use of the saw assembly, wherein the first cutting direction comprises an inclined cutting direction offset from vertical for inclined cutting through the saw area, and wherein the material is cut along the first cutting direction by vertical displacement of the chain saw from a first position in which the saw chain is disposed above the saw area and through the saw area into a second position in which the saw chain is disposed below the saw area such that the chainsaw can swivel to cut in a different cutting direction, wherein the material is further conveyed along a feed direction, and wherein the chainsaw swivel device is further configured to swivel the entering section of the saw chain into a second cutting direction by rotating the chainsaw swivel device around a rotational axis, wherein the moving device is configured to move the chainsaw through the saw area along the second cutting direction set by the chainsaw swivel device, and wherein the material is cut along the second cutting direction by vertical displacement of the chain saw from the second position into the first position.

12. The method according to claim 11, wherein the first cutting direction or the second cutting direction runs at an inclination to the feed direction.

13. The method according to claim 11, wherein, in order to cut the cutting material along an inclined cutting direction, the chainsaw is tilted, and thereby aligned in the cutting direction, and the chainsaw is moved transverse to the feed direction parallel through the saw area and, during the cutting process, the cutting material is moved along the feed direction during the cutting process.

14. The method according to claim 11, further comprising moving the chainsaw by actuating a moving device for cutting along the first cutting direction or the second cutting direction.

15. The method according to claim 11, further comprising moving the cutting material along the feed direction by actuating a feed device.

16. The method according to claim 14, further comprising alternatingly crosscutting or cutting the cutting material along the first and second cutting direction by actuating the moving device and feed device.

17. The method according to claim 14, wherein the entering section of the saw chain faces in the respective cutting direction while cutting along the first cutting direction and while cutting along the second cutting direction.

18. The method according to claim 11, wherein the exiting section of the saw chain is arranged on one side of the chainsaw, the entering section of the saw chain is arranged on the opposite side of the chainsaw, and the chainsaw is swiveled by actuating the chainsaw swivel device after cutting the material along the first cutting direction and before cutting the material along the second cutting direction, and during further cuts also after again cutting the material along the second cutting direction and before again cutting the material along the first cutting direction.

19. The saw assembly according to claim 1, wherein, in the second operating mode, the chainsaw swivel device is configured to swivel the entering section of the saw chain into another second cutting direction which is an inclined cutting direction offset from vertical for inclined cutting through the saw area.

* * * * *